United States Patent [19]
Hall et al.

[11] 3,914,519
[45] Oct. 21, 1975

[54] PROCESS AND COMPOSITION FOR COATING METALS
[75] Inventors: Wilbur S. Hall, Plymouth Meeting; Lester Steinbrecher, Southampton, both of Pa.
[73] Assignee: Amchem Products, Inc., Ambler, Pa.
[22] Filed: Dec. 3, 1973
[21] Appl. No.: 421,259

Related U.S. Application Data
[60] Division of Ser. No. 152,992, June 14, 1971, Pat. No. 3,776,848, which is a continuation-in-part of Ser. No. 791,801, Jan. 16, 1969, Pat. No. 3,585,084, which is a continuation-in-part of Ser. No. 554,336, June 1, 1966, abandoned.

[52] U.S. Cl. ................................ 428/457; 428/471
[51] Int. Cl.² ...................... B05D 5/08; B05D 7/14
[58] Field of Search ............ 117/113, 134, 135, 89; 148/6.14 R

[56] References Cited
UNITED STATES PATENTS

| | | | |
|---|---|---|---|
| 2,741,567 | 4/1956 | Otto | 117/134 |
| 3,585,084 | 6/1971 | Steinbrecher et al. | 117/113 X |
| 3,709,743 | 1/1973 | Dalton et al. | 117/113 X |
| 3,776,848 | 12/1973 | Hall et al. | 117/134 X |

Primary Examiner—Harris A. Pitlick
Attorney, Agent, or Firm—Synnestvedt & Lechner

[57] ABSTRACT

A lubricating coating is applied to a metallic surface by treating the surface with an acidic aqueous coating composition comprising a coating-forming lubricant and an oxidizing agent.

13 Claims, No Drawings

PROCESS AND COMPOSITION FOR COATING METALS

This is a division of application Ser. No. 152,992, filed June 14, 1971 (now U.S. Pat. No. 3,776,848), which, in turn, is a continuation-in-part of application Ser. No. 791,801, filed Jan. 16, 1969 (now U.S. Pat. No. 3,585,084), which is a continuation-in-part of application Ser. No. 554,336, filed June 1, 1966, now abandoned.

This invention relates to the application of coatings to metallic surfaces.

Hereinafter in this specification, as well as in the claims appended hereto, the term "ferriferous" means iron, steel, and alloys of iron; the term "steel" is meant to denote alloys of iron wherein iron is the principal ingredient, such as cold- and hot-rolled steel in which the alloying constituents comprise minor amounts of carbon, silicon, and manganese. When utilized herein, the term "zinciferous" means zinc and zinc alloys in which zinc is the principal constituent, as well as galvanized surfaces, including both hot-dipped and electrogalvanized surfaces.

The aforementioned applications, the disclosures of which are incorporated herein by reference, disclose a method and composition for applying coatings to metallic surfaces by immersing or dipping the metallic surface in an acidic aqueous composition comprising an organic coatingforming material and an oxidizing agent. Examples of organic coating-forming materials which can be utilized in the invention described in the aforementioned applications are polymeric resinous film-forming materials such as polyethylene, polyacrylics, and styrene-butadiene copolymers. The filmforming material can be present in the acidic aqueous coating composition in dissolved, emulsified or dispersed form. Examples of oxidizing agents used in the coating composition are hydrogen peroxide, dichromate, perborate, bromate, permanganate, nitrite, nitrate and chlorate. A preferred coating composition is an acidic aqueous composition comprising fluoride ion, an oxidizing agent selected from the class consisting of hydrogen peroxide and dichromate, and particles of a filmforming resin dispersed in the composition, wherein the fluoride ions are added to the composition in the form of hydrofluoric acid and wherein the pH of the composition is within the range of about 1.6 to about 3.8.

The aforementioned application Ser. No. 791,801 (now U.S. Pat. No. 3,585,084) discloses also that the coating-forming ingredient of the coating composition can be an organic material other than that of the polymeric resinous type. As will be explained more fully below, the invention described herein includes within its scope the formation of coatings from such other types of organic, coating-forming materials.

Coating compositions described in the aforementioned applications have a number of extremely important unique characteristics. For example, the coating compositions are effective in forming resinous coatings, the weights or thickness of which are related to the time the metallic surface is immersed in the composition. The longer the time of immersion, the heavier or thicker the coating. This characteristic is not possessed by known organic coating compositions. For example, it is known that a conventional latex, that is a dispersion of a film-forming polymeric material in water, can be utilized to form organic coatings on metallic surfaces by immersing the surface in a bath of the latex; however, the thickness of the resultant coating is substantially the same regardless of how long the surface is immersed. In essence, the weight or thickness of a coating that can be obtained from a particular latex is limited when the surface is simply immersed therein. In order to build up the thickness of the coating, applicators have subjected metallic surfaces to a multiple stage coating operation in an effort to attain a coating of the desired thickness. Such operation includes immersing the metallic surface in a latex bath, withdrawing the surface, drying or fusing (as by heating) the coating formed thereon and then repeating the immersion and drying steps until the thickness of the coating is satisfactory. This, of course, is a time-consuming and costly operation. Moreover, the resins of some film-forming latices do not adhere to themselves readily and efforts to build up layer upon layer of the resin have been frustrated or special techniques must be utilized. This further adds to the cost of the multiple stage application process. These disadvantages can be avoided by the use of the compositions described in the aforementioned applications.

Another undesirable characteristic of known organic film-forming compositions is that the coating deposited on the metallic surface is not initially adherent to the surface. For example, the coating cannot be rinsed without removing virtually all of the coating from the surface. This evidences a lack of adherence to the substrate. On the other hand, the coatings formed from the compositions described in the aforementioned applications are initially adherent to the substrate and resist being rinsed therefrom even when they are still wet.

Another shortcoming of utilizing known organic film-forming compositions is that little or no coating is formed on the edges of the metallic article. However, coatings formed from the compositions described in the aforementioned applications adhere to the edges of the article.

Continuing with a more detailed description of the invention described in the aforementioned applications, the organic coating-forming material, as mentioned above, may be present in the acidic aqueous composition either in dissolved form, emulsion form, or in the form of insoluble particles dispersed in the composition. The coating-forming material may be either a resinous compound or a non-resinous compound. Examples of non-resinous coating materials that can be utilized are fatty acids, such as for example stearic acid. Examples of water soluble resinous materials are polyacrylic acid and ethylene maleic anhydride (Monsanto DX-840-12). Aqueous solutions of polyacrylic acids are available commercially, for example those sold under the name Acrysol A-1 and Acrysol A-3. It is preferred to utilize an aqueous composition which has particles of resin dispersed in it.

In formulating a coating composition that has particles of resin dispersed in it, it is preferred that the other ingredients of the composition be added to a latex, that is a dispersion of insoluble resin particles in water. Latices, which are the source of the dispersed resin particles are readily available and those sold commercially can of course be utilized. Examples of commercially available latices are Pliolite 491, a styrene-butadiene latex; Catalin 1464, an acrylic co-polymer latex; Polyem 40, a polyethylene latex; Geon 552, a polyvinyl chloride latex; and Teflon, a polytetrafluoroethylene. In addition to having dispersed therein resin solids, latices usually contain other ingredients including, for example, emulsifiers and protective colloids.

The acid and oxidizing agent are preferably added to the latices in solution form. Upon addition of these ingredients to a latex, there is obtained a composition which can be characterized as an acidic aqueous solution of an oxidizing agent having dispersed therein solid resin particles.

The amount of organic coating-forming material utilized in the acidic aqueous composition can vary over a wide range. The lower concentration limit is dictated by the amount of coating material needed to provide sufficient material to form a coating. The upper limit is dictated by the amount of material which can be dissolved, emulsified, or dispersed in the acidic aqueous composition. Although higher or lower amounts can be used, it is preferred that the amount of coating-forming material be within the range of about 5 to about 550 g/l of coating composition.

The coating composition is acidic and thus contains hydrogen ion. Any acid, present in an amount sufficient to impart a pH of less than 7 to the composition, can be used. For example, the acid can be a mineral or an organic acid. Typical examples of mineral acids that can be used are sulphuric, hydrochloric, hydrofluoric, nitric, phosphoric, hydrobromic and hydroiodic. Examples of organic acids that can be used are acetic, chloracetic, trichloracetic, lactic, tartaric and polyacrylic acid. Examples of other acids that can be used are fluoboric, fluotitanic and fluosilicic. Hydrofluoric acid is a preferred acid.

With respect to the use of an acid such as, for example, polyacrylic acid, a resinous material of this nature which is soluble in the composition can be the source of the necessary hydrogen ions. By way of example, it is noted that polyacrylic resinous coatings have been applied to steel panels from an aqueous solution of polyacrylic acid and hydrogen peroxide.

It is noted also that an acid which contains an anion that functions as an oxidizing agent can be the source of not only hydrogen ion, but also the oxidizing agent. An example of such an acid is nitric acid.

As previously mentioned, it is preferred that the aqueous composition have a pH within the range of about 1.7 to about 3.8. Suitable amounts of acids can be used to impart to the composition a pH within the preferred range.

The acid component dissociates, of course, to yield hydrogen ion and an anion. If it is desired to have a particular anion present in a composition such as, for example, fluoride ion, which gives particularly good results, and it is desired also to use an acid other than one which contains the particular anion, then the anion can be added by way of a soluble salt containing the anion.

Any oxidizing agent can be utilized in the coating composition. Examples of oxidizing agents are hydrogen peroxide, dichromate, perborate, bromate, permanganate, nitrite, nitrate, and chlorate. Oxidizing agents can be conveniently added to the composition in the form of water soluble salts, such as for example alkali and ammonium salts. Particularly good results have been obtained when the oxidizing agent is one which releases oxygen in the acidic aqueous coating composition. The preferred oxidizing agents are hydrogen peroxide and dichromate, with hydrogen peroxide being most preferred. Hydrogen peroxide can be added conveniently to the composition in the form of a 30% aqueous solution. As to the source of dichromate, excellent results have been obtained by utilizing a dichromate salt, for example calcium dichromate. However, any water soluble hexavalent chromium-containing compound, which forms dichromate in an aqueous acidic medium can be used. For example, chromates and chromic acid can be used as the source of dichromate.

The amount of oxidizing agent that should be used is an amount sufficient to provide an oxidizing equivalent of at least 0.01 per liter of the composition. (The term "oxidizing equivalent" when used herein means the number of grams of oxidizing agent used divided by the equivalent weight of the oxidizing agent. The equivalent weight of the oxidizing agent is the gram molecular weight of the agent divided by the change in valence of all atoms in the molecule which change valence (usually one element).) Amounts of oxidizing agents which provide an oxidizing equivalent somewhat below 0.01 can be used but preferably the oxidizing equivalent should be at least within the range of about 0.01. It appears that there is no critical upper limit as to the oxidizing equivalents that are used; however, it is preferred that the oxidizing agent be present in an amount such that the upper oxidizing equivalent value is about 0.2. However, it should be understood that the oxidizing agent can be used in an amount to provide an oxidizing equivalent much higher than 0.2, for example, 1 or more.

Optional ingredients, examples of which are discussed below, can be added to the above described coating compositions.

Coalescing agents can be added to the coating composition to improve the corrosion resistance and paint adhesive properties of the coatings. Examples of coalescing agents that can be used are: hexylene glycol, diethylene glycol monoethyl ether acetate, diethylene glycol monobutyl ether acetate and ethylene glycol monobutyl ether acetate. A preferred coalescing agent is ethylene glycol monobutyl ether commonly known as butyl Cellosolve. Although higher or lower amounts can be used, it is preferred to use about 5 to about 30 g/l of the coalescing agent in the coating composition.

Wetting agents, preferably non-ionic or anionic, can be added to the composition to assure thorough wetting of the metallic surface in an amount for example, of up to about 0.15% by wt. over and above that which may be present in the source of the coating-forming material, for example a latex. Alkyl phenoxy polyethoxy ethanol and sodium salts of alkylaryl polyether sulfonates are examples of wetting agents.

Coatings of various colors can be produced by adding to the coating composition water-dispersible pigments such as, for example, phthalocyanine blue, phthalocyanine green, carbon black and quinacridone red. The amount of pigment added will depend on the depth or degree of hue desired.

The coating compositions can be utilized to coat a variety of metals. Particularly good results have been obtained in the coating of ferriferous and zinciferous surfaces.

The following are exemplary of the conditions under which coatings may be applied to the metallic surfaces. The metallic surface can be immersed in the coating composition for as little as 30 seconds to as much as 10 minutes or even longer depending on the weight or thickness of coating that is desired. The temperature of the coating bath can be operated anywhere from ambient temperature (about 20°C) to about 40°C or higher depending on the temperature at which the bath tends to become unstable. The coatings can be formed without utilizing electricity as is used in the electrocoat or electrodeposit process for painting metals. The metallic surface may have an electrical charge as a result of being immersed in the coating composition, but a charge applied from an external electrical source is not needed.

After withdrawing the metallic surface from the coating composition it may, if desired, be rinsed with water. The corrosion resistance of the coatings can be improved by rinsing them with available aqueous rinse solutions containing chromium, for example, a dilute solution of chromic acid.

Whether or not the coating is rinsed, it should be allowed to dry by evaporation of water. In the case of a resinous coating, it should be allowed to fuse into a continuous coating or film. The conditions under which the drying and fusing are carried out will depend on the type of resin employed and can be best selected on the basis of experience. For illustrative purposes, it is noted that temperatures within the range of 110°C to 150°C can be used; however, the fusion of tetrafluoroethylene polymeric coatings require appreciably higher temperatures.

Coatings with different types of properties, depending on the type of coating-forming material used, can be formed from coating compositions described above. For example, coatings with excellent corrosion resistant properties and paint bonding characteristics can be produced when the coating-forming material is a polymer such as polystyrene, styrene-butadiene copolymer and polyvinyl-chloride. Another type of coating which can be formed from compositions within the scope of the above described invention is one which has lubricating properties; an example of a coating composition which will form a lubricating coating and which is disclosed in the aforementioned application Ser. No. 791,801 (now U.S. Pat. No. 3,585,084) is one in which the coatingforming material is a fatty acid, such as stearic acid. The present invention is directed to the application to metallic surfaces of coatings which have lubricating properties by utilizing the acidic aqueous type of composition disclosed in said Ser. No. 791,801 (now U.S. Pat. No. 3,585,085).

By way of background, it is noted that it is well known to apply to metals which are to be subjected to metal working operations such as forging, drawing, extruding, etc. coatings which have lubricating properties. Such coatings function to avoid or deter the marring or seizing of the metallic surface; in addition, wear of the die surface of the metal working apparatus is reduced.

The present invention is directed to the formation on metallic surfaces of lubricating coatings by treating the metallic surface with an acidic aqueous coating composition comprising an organic lubricant and an oxidizing agent. The lubricating coatings can be applied advantageously to metallic surfaces which are subjected to metal working operations such as forging, extruding, drawing, stamping, molding, etc.

Any organic lubricant which is capable of forming a coating on a metallic surface from the acidic, water-based composition can be used in the practice of this invention. The vast majority of the organic lubricants are insoluble in an acidic aqueous medium. However, such insoluble lubricants can be used provided they are capable of being water-solubilized or are dispersible in the water phase of the composition in the form of liquid or solid particles. In accordance with known methods, this can be done with the aid of surfactants such as emulsifiers, dispersants, wetting agents, etc.

Examples of organic lubricants that can be used in metal working operations are: fatty oils; fatty acids; waxes; and mineral oils. These broad classes of lubricants include materials such as, for example: sulfurized fatty oils and fatty oils from animals, vegetables and fish; waxes of mineral, vegetable, animal or synthetic origin; modified mineral oils such as sulfurized mineral oil and light solvents and neutral oils. Such materials, which are well known, can be used alone or in combination as the coating-forming lubricant in the composition of this invention provided that they are capable of being uniformly distributed throughout the acidic aqueous phase of the composition. Organic lubricants which cannot be so distributed will tend to separate from the aqueous phase as by precipitating or forming a water immiscible layer.

Distributing the solid or liquid coating-forming lubricant in the aqueous phase of the composition can be carried out according to known techniques. For example, a mixture of a solid organic lubricant and emulsifiers or dispersants can be melted and the resulting melt can be dispersed by adding thereto, with stirring, water which has been heated to a temperature above the melting point of the mixture.

Preferably, the organic lubricant for use in this invention should evidence stability by remaining uniformly distributed throughout the acidic aqueous phase of the composition. Stirring of the composition may be used to maintain a uniform dispersion during the coating operation.

The amount of coating-forming lubricant that can be used in the composition of the present invention can vary over a wide range. The lower concentration limit is dictated by the amount of lubricant needed to provide sufficient material to form a coating on the metallic surface. This will vary depending on the specific coating-forming lubricant that is used. The upper limit is governed by the amount of lubricant that is capable of being incorporated uniformly throughout the acidic aqueous phase of the composition at a viscosity suitable for application. This, too, will tend to vary depending on the specific coating-forming lubricant that is used. In general, heavier lubricating coatings will be formed the higher the concentration of lubricant present in the composition, other variables held constant.

Of the various types of organic lubricants that are available, some are more widely used in metal working operations than others because of their good overal lubricating properties and because they are readily available at a relatively low cost. It is believed that such lubricants will be the most widely used in the practice of the present invention; an example of such a lubricant and one that is preferred for use in the composition of the present invention is stearic acid, a fatty acid.

Stearic acid, which is a solid at room temperature, can be dispersed in water according to known methods. For example, a mixture of stearic acid and dispersing agents can be heated to the melting point of the stearic acid, about 70°C; water heated to about the same temperature can be added slowly with good agitation to the molten mixture until the emulsion inverts from water-in-oil to oil-in-water. Thereafter, the remainder of the water can be added more rapidly. Stirring of the dispersion should be continued as the remainder of the water is added and during cooling also. To this dispersion, there can be added the acid and oxidizing agent. The resultant coating composition can be characterized as an acidic aqueous solution of an oxidizing agent having dispersed therein particles of stearic acid. Preferred coating compositions containing about 20 g/l to about 80 g/l of stearic acid have been prepared in the above described manner.

The above method is exemplary of the way other water insoluble solid organic lubricants can be dispersed in water. Aqueous dispersions can be made from water insoluble or immiscible liquid organic lubricants by similar procedures carried out at ambient temperature.

The acidity of the coating composition can vary over a wide range also and is influenced by the other ingredients comprising the composition, particularly the specific lubricant used. Guidelines for determining an operating pH are as follows. The pH should not be so low that the composition etches, but does not coat, the metallic surface. As the pH is increased above the value at which only etching of the metallic surface is effected heavier and heavier coatings can be formed until, for any given composition, a maximum coating weight is obtained; this will generally occur at a pH well below 7. As the pH is increased toward 7, the coating weights begin to decrease and coatings which appear to be comprised primarily of inorganic materials are produced. The optimum pH range for any given composition may be best determined from experience. A pH range of about 2 to about 5 is recommended for the deposition of stearic acid coatings.

The preferred aqueous acidic lubricating coating composition of this invention contains fluoride ion. The preferred method for making the composition acidic and adding fluoride ion comprises the use of hydrofluoric acid. This acid permits a simple means for control over pH requirements of the composition and obviates the need for introducing the fluoride ion in the form of an alkali metal, ammonium or other salt. While lubricating coatings can be obtained by adding the fluoride in salt form, it is preferred to utilize hydrofluoric acid and avoid the use of salts which may give rise to undesirable cations in the coating composition or complicate pH adjustment. If the fluoride component is added in the form of a salt, the pH of the composition can be adjusted by the use of acids other than hydrofluoric or in combination with hydrofluoric. Examples of such acids include sulfuric, phosphoric, nitric and hydrochloric.

With respect to the fluoride ion concentration, amounts within the range of about 2 to 8 g/l of composition (calculated as F) are preferred. Nevertheless, higher or lower amounts can be utilized. Other variables held constant, an insufficient amount of fluoride tends to produce coatings which are thinner than desired; an excess amount of fluoride tends to form coatings which do not adhere satisfactorily to the metal substrate.

The oxidizing agent used in the preferred coating composition is a peroxide. Although metal peroxides such as alkali and alkaline earth metal peroxides can be used, the use of hydrogen peroxide is most preferred.

The hydrogen peroxide can be added conveniently to the composition in the form of a 30% aqueous solution of hydrogen peroxide.

The preferred amount of oxidizing agent is an amount sufficient to provide an oxidizing equivalent of about 0.1 to about 0.2 in one liter of the composition.

Optional ingredients or additives which commonly are used with metal working lubricants can be added to the composition of the present invention. Examples of such materials are rust preventatives, odor control agents, antiseptics, etc.

Lubricating coatings formed according to the present invention have properties which prevent metal-to-metal contact thereby facilitating metal deformation without galling, scratching, etc. Analyses of the coatings have shown that they are comprised of both inorganic and organic components. The inorganic component appears to be comprised primarily of metal salts of the base metal. The organic component comprises the organic lubricant ingredient of the coating composition. In depositing stearic acid coatings, the organic component can vary over a wide range, for example about 25 wt.% to about 95 wt.%.

As illustrative of lubricating coatings formed in accordance with this invention, it is noted that a coating composition containing stearic acid, HF and $H_2O_2$ produced different types of coatings depending on the pH and concentration of ingredients in the composition. With a pH in the range of about 2 to about 2.7, coatings of a uniform gray color can be produced on cold rolled steel panels; in traversing this pH range, it was noted that the coatings increased in weight as the pH of the composition was increased. Additional increases in the pH resulted in the deposition of "patterned" coatings which consisted of a dark gray background on which there were light gray striations; this was in a pH range of about 2.7 to about 3.5. Additional increases in the pH produced coatings which were thinner and lower in weight and which were amber in color. These coatings appeared to be comprised of a high proportion of inorganic materials. The heaviest coatings and those with the highest proportion of organic lubricant were the patterned coatings. The best lubricating performance was obtained with coatings which contained the highest proportion of organic component which was soluble in toluene, for example at least about 50 wt.%. Those coatings which contained a relatively low proportion of toluene soluble organic components gave poorer lubricating performance. For best lubricating performance, it is recommended that the pH and concentrations of the coating bath be adjusted to produce such coatings. In the event that the coating bath is forming uniformly gray or amber colored coatings or coatings which are not as thick as desired, the concentration of the ingredients or the pH of the bath can be adjusted until the desired coating is produced.

Prior to applying the coating composition, the metallic surface should be cleaned. Preferred cleaning methods include degreasing with neutral or slightly acidic detergent systems and alkaline cleaning followed by pickling and rinsing. It has been observed in cleaning with alkaline alone that low wet film adhesion is encountered.

The coating composition can be applied to the metallic surface in any suitable way such as, for example, by flow-coating or low pressure spraying. It is believed that for most applications, the most convenient way for applying the coating composition will be to immerse the metallic surface therein.

The contact time between the coating composition and the metallic surface can be controlled as desired. Suitable coatings can be formed usually within about 15 seconds to about 5 minutes. The longer the metallic surface is immersed in the coating composition the greater the thickness or the weight of the coating. Analyses of coatings show that the inorganic materials which make up the coatings comprise an increasing proportion of the coating the longer the metallic substrate has been immersed in the coating composition.

The coating bath is operated preferably at ambient temperature. Elevated temperatures can be used, but temperatures which cause the bath to become unstable should be avoided. In working with stearic acid baths, it was noted that temperatures in excess of about 100°F tended to produce coatings with poor adhesion.

It is preferred that relative motion be maintained between the coating composition and the metallic surface immersed therein. This facilitates coating formation and improves coating continuity and adhesion.

Following the deposition of the lubricating coating on the surface of the metallic object, the coated surface should be rinsed with water for the purpose of removing acidic residue which tends to cling to the coating.

Whether or not the coated surface is rinsed, the coating should be allowed to dry by evaporation of water. This permits the coating to set and adhesion to the substrate increases.

The conditions under which the drying operations are carried out depend somewhat on the coating-forming lubricant employed. Air drying with low pressure compressed air can be used. Elevated temperatures which do not affect adversely the coating may be used also.

The metallic surface having thereon the lubricating coating can be subjected to any of the metal-forming operations in accordance with known procedures.

If desired, lubricating coating which remains on the metallic surface after it has been subjected to the metal-forming operation can be removed by spray cleaning, preferably using neutral or slightly acidic detergent systems.

Examples which follow illustrate the present invention.

EXAMPLES

EXAMPLE 1

An aqueous dispersion of stearic acid was prepared as follows. A mixture of 50 grams of stearic acid (sold by Emery Industries, Inc. as Emersol 150), 14 grams of a highly ethoxylated non-ionic surfactant (sold by Atlas Chemical Industries, Inc. as Myrj 52-S) and 11 grams of an alkyl aryl sulfonate (sold by Atlas Chemical Industries, Inc. as G-3300) was prepared. This mixture was melted and maintained at a temperature of about 70°C. Water which had been heated to a temperature of about 72°C – 80°C was added slowly with stirring to the melted mixture until the aqueous emulsion of stearic acid formed. Thereafter additional hot water was added to the emulsion more rapidly as stirring was continued until a total of somewhat less than 1 liter of water was added. The emulsion was allowed to cool to room temperature as stirring was continued. The resulting dispersion was used to prepare 600 ml of coating composition that contained 1.26 grams of HF and 1.0 gram of $H_2O_2$. The pH of the coating composition was about 2.1.

A cold rolled steel panel, 3 inches × 3 inches, was immersed for 1 minute in the above described composition as it was stirred. The panel was withdrawn from the composition, rinsed with running tap water and dried with low velocity compressed air. It was observed that no appreciable coating was formed.

The extent to which the pH of coating compositions of the type prepared in Example 1 has an effect on the weights of the coatings that are produced is illustrated in Examples 2–9 in Table 1 below. To the coating composition of Example 1, there was added 6N NaOH in the amounts indicated in Table 1. The pH's of the resulting compositions are set forth also. Clean, cold rolled, steel panels were coated in the compositions as set forth in Example 1. The coatings formed on the panels are described in Table 1.

TABLE 1

| Ex. No. | Coating Composition Total | | | Coating Wt., mg/ sq. ft. | Coating Appearance |
|---|---|---|---|---|---|
| | 6N NaOH added, ml | 6N NaOH added, ml | pH | | |
| 2 | 2 | 2 | 2.7 | 96 | uniformly gray |
| 3 | 2 | 4 | n.m.* | 135 | " |
| 4 | 1 | 5 | 3.2 | 336 | patterned gray |
| 5 | 1 | 6 | n.m.* | 304 | " |
| 6 | 1 | 7 | 3.5 | 248 | " |
| 7 | 1 | 8 | n.m. | 184 | " |
| 8 | 1 | 9 | 3.7 | 72 | uniformly amber |
| 9 | 1 | 10 | n.m. | 16 | " |

*not measured

With respect to the appearance of the coatings formed by the coating compositions of Examples 2–9, it is noted that the uniformly gray coatings were of a light medium shade of gray. The patterned heavier coatings that were produced had a dark gray background with light gray striations. The amber coatings were an orange-brown color.

In another series of tests, 1 liter of the aqueous composition described below was prepared:

| Ingredients | Amount, grams per liter |
|---|---|
| stearic acid | 30.0 |
| hydrofluoric acid | 4.2 |
| hydrogen peroxide | 1.7 |

The stearic acid was dispersed in the aqueous phase of the composition by emulsifiers. The HF and $H_2O_2$ were dissolved in the aqueous phase.

The composition had a free acidity of 11.4 and a total acidity of 16.7. This composition, modified by the additions thereto of sodium hydroxide, hydrofluroic acid, hydrogen peroxide and stearic acid as indicated in Tables 2–6 below, was utilized to coat 3 inches × 3 inches cold rolled steel panels over a few week period. During this period of time, a total of 68 square feet of metal was coated. In the examples reported in Table 2, the panels were immersed in the coating composition for 1 minute at room temperature, and after being withdrawn, the coated panels were rinsed with running tap water and were dried with low velocity compressed air. The coating weights and the appearance of coatings that were produced on representative panels are set forth in Table 2 below. The total and free acidity of the composition which was measured periodically is set forth also. The total acidity was the number of ml needed to titrate a 5 ml sample of the coating composition mixed with 100 ml of neutralized ethyl alcohol with 0.1 N NaOH to the first pink color that persists for 15 seconds using phenol-phthalein as the indicator. The free acidity was the number of ml needed to titrate a 5 ml sample of the coating composition mixed with 100 ml of deionized water with 0.1N NaOh to the first blue coloration using Brom Cresol Green as the indicator. The total acidity minus the free acidity is an indication of the approximate amount of stearic acid in the bath; a difference of 10 ml is equivalent to approximately 50 g/l of stearic acid.

composition for the periods of time indicated in Table 3 below. After being withdrawn from the composition, the panels were rinsed with running tap water and dried with low velocity compressed air. The coatings produced were of a uniform gray color and their weights are as set forth in Table 3.

TABLE 3

| Ex. No. | Time of Immersion, Minutes | Weight of Coatings mg/sq.ft. |
|---|---|---|
| 25 | 1 | 360 |
| 26 | 3 | 600 |
| 27 | 5 | 752 |

TABLE 2

| Ex. No. | Additions to Coating Comp. Ingred. | Additions to Coating Comp. Amt. of Ingred. | Acidity of Coating Comp. Free | Acidity of Coating Comp. Total | Cumulative sq. ft. of met. processed | Coatings of Representative Panels Wt, mg /sq. ft. | Coatings of Representative Panels Appear. |
|---|---|---|---|---|---|---|---|
| 10 | 6N NaOH | 10 ml | — | — | — | 128 | Uniformly gray |
| 11 | '' | 10 '' | 5.5 | 10.8 | — | 272 | '' |
| 12 | '' | 2 '' | — | — | — | 360 | '' |
| 13 | '' | 2 '' | — | — | — | 392 | '' |
| 14 | '' | 2 '' | — | — | — | 472 | '' |
| 15 | '' | 2 '' | — | — | — | 480 | Patterned gray |
| 16 | '' | 1 '' | — | — | — | 568 | '' |
| 17 | '' | 1 '' | — | — | — | 448 | '' |
| 18 | '' | 1 '' | — | — | — | 408 | Uniformly amber |
| 19 | '' | 2 '' | — | — | — | 312 | '' |
| 20 | — | — | 1.9 | 7.8 | 2 | 312 | '' |
| 21 | HF $H_2O_2$ | 0.63g 0.20g | 3.7 | 9.3 | 3 | 496 | gray |
| 22 | — | — | 3.8 | 9.2 | 14 | 240 | '' |
| 23 | $H_2O_2$ | 0.66g | 4.5 | 9.9 | 14+ | 416 | '' |
| 24 | — | — | — | — | 14+ | 528 | '' |

It is noted that the compostion used to coat the panels of Examples 1–9 of Table 1 above contained a higher proportion of stearic acid than the composition used to coat the panels of Examples 10–24. Analyses of these coatings showed that those of Examples 1–9 were comprised of a higher proportion of organic material than those of Examples 10–24.

The next group of examples illustrates that coatings of increasing weight can be produced by prolonging the time of immersion of a metallic surface in a composition within the scope of this invention.

The coating composition utilized to coat the panel of Example 24 in Table 2 above was replenished with 8 ml of an aqueous dispersion of stearic acid containing 0.32g of stearic acid and 0.05g of hydrofluoric acid per square foot of steel processed. The concentration of $H_2O_2$ in the composition was maintained at about 1.67 g/l by periodic additions of a 30 wt. % aqueous solution of $H_2O_2$. The $H_2O_2$ concentration in the coating composition was measured periodically by determining the number of ml of 0.042N potassium permanganate needed to titrate a 2 ml sample of the coating composition mixed with 25 ml of tap water and 1–2 ml of 50% $H_2SO_4$ to the first pink color which persists for 15 seconds. One ml of the titrant is equivalent to about 0.3 g/l of $H_2O_2$. After processing about 11 square feet of metal panels in the replenished composition and imparting thereto frosty gray coatings, analysis of the composition showed that it had a free acidity of 5.2 and a total acidity of 10.5. Metal panels were immersed in this After the coatings of Example Nos. 25–27 were dry, it was found that the coatings of Examples 26 and 27 could not be removed by finger abrasion. A small portion of the coating of Example 25 was removed by finger abrasion, but with difficulty Three ml of of 6N sodium hydroxide were added to the dispersion utilized to coat the panels of Examples 25–27. The resulting composition had a free acidity of 5.3 and a total acidity of 10. Panels were immersed in this composition for the periods of time indicated in Table 4 below. The coated panels were rinsed with running tap water and dried with low velocity compressed air. Patterned gray coatings, the weights of which are set forth in Table 4, were obtained.

TABLE 4

| Ex. No. | Time of Immersion, Minutes | Weight of Coatings, mg/sq.ft. |
|---|---|---|
| 28 | 1 | 536 |
| 29 | 3 | 848 |
| 30 | 5 | 904 |

To the composition that was utilized to coat the panels of Examples 28–30 above, there was added 4 ml of .6N sodium hydroxide. Panels were immersed in this composition for the periods of time indicated in Table 5 below, withdrawn and then rinsed with running tap water and dried with low velocity compressed air. Amber coatings, the weights of which are set forth in Table 5, were obtained.

TABLE 5

| Ex. No. | Time of Immersion, Minutes | Weight of Coating, mg/sq.ft. |
|---|---|---|
| 31 | 1 | 192 |
| 32 | 3 | 488 |
| 33 | 5 | 664 |

Analyses of coatings produced on the panels of Examples 25–33 showed that the heavier coatings were made-up of a higher proportion of inorganic ingredients (toluene-insoluble) and thus less organic material (toluene-soluble). As mentioned above, the lubricating properties of the coatings tend to be better the higher the proportion of organic material comprising the coating.

The adhesive properties of the coatings produced on the panels of Examples 25–33 were evaluated after the coatings were allowed to stand over night; the coatings could not be removed by finger abrasion.

At this stage of the operation of the above described coating bath, about 28 sq. ft. of metal had been procssed through it. The use of the bath was continued, modified by the addition of various ingredients as indicated in Table 6 below. In addition to the ingredients identified in Table 6, the coating bath was replenished also with 8 ml /sq.ft. of metal processed of a replenisher that contained 40 g/l of dispersed stearic acid and 6.3 g/l of hydrofluoric acid.

In comparing the coatings of the hot rolled steel panels of Examples 40, 42 and 44 with those produced on the cold roll steel panels of Examples 39, 41 and 43 it was found that the former contained a higher proportion of inorganic material. Also, and as can be seen from Table 6, the coatings produced on the hot rolled steel panels were heavier than those produced on the cold rolled steel.

It is noted also that when the concentration of the $H_2O_2$ was at a relatively high level, for example about 3.3 g/l (Examples 47–49), the coating compositions formed coatings that were very adherent and hard. Such compositions can be used to form coatings for applications in which better adhesive properties are desired; also, permanent protective coatings can be formed.

The lubricating properties of coatings produced in accordance with the present invention were evaluated in a test referred to herein as the "drawmeter test." This test evaluates the lubricating properties of the coating by comparing the deformation produced in a test specimen with the force required to pull the specimen between two polished flat dies at increasing levels of applied compression. The test specimens were coated cold-rolled mild steel rods which were about 7 inches long and about ¼ inches by ⅜ inches in rectangular cross section. The coated test specimen is held fixed in the stationary jaw of a tensile testing machine (W. C. Dillon & Co., Inc.) equipped with a dynamometer. A hinged jaw was affixed to the movable head of the tensile testing machine and two polished flat dies were mounted in the jaw. The dies are tightened against opposite faces at the top of the steel rod by a screw bearing against the hinged jaw. Upon activating the machine, the dies are moved downwardly along the length of the rod and increased compression is applied periodically to the rod by the dies by tightening the aforemen-

TABLE 6

| Ex. No. | Additions to Coating Comp. Ing. | Amt. of Ing. | Conc. $H_2O_2$ g/l | Acidity of Coating Comp. Free | Acidity of Coating Comp. Total | Cumulative Sq. Ft. of Metal Processed | Coatings of Representative Panels Wt. mg/Sq. Ft. | Coatings of Representative Panels Appear. |
|---|---|---|---|---|---|---|---|---|
| 34 | — | — | 1.6 | 5.3 | 10 | 28 | — | amber |
| 35 | $H_2O_2$ | 0.8g | 2.3 | — | — | — | — | " |
| 36 | HF | 0.8g | 2.2 | — | — | — | — | patterned |
| 37 | $H_2O_2$ | 1.0g | 3.1 | — | — | — | — | amber |
| 38 | HF | 0.6g | 3.0 | 8.0 | 12.5 | 30 | 600 | gray |
| 39 | $H_2O_2$ | 0.17 | 3.1 | — | — | — | 560 | " |
| 40 | — | — | — | — | — | — | 736 | "* |
| 41 | 6N NaOH | 3 ml | | — | — | 31 | 704 | patterned |
| 42 | — | — | — | — | — | — | 736 | patterned* |
| 43 | 6N NaOH | 7 ml | — | — | — | 33 | 352 | amber |
| 44 | — | — | — | — | — | — | 528 | amber* |
| 45 | — | — | 3.3 | 5.1 | 9.9 | 37 | 440 | amber |
| 46 | — | — | 3.2 | — | — | 43 | — | " |
| 47 | HF | 1.0g | 3.3 | — | — | — | 528 | gray |
| 48 | — | — | — | — | — | 48 | 552 | " |
| 49 | — | — | 3.3 | — | — | 53 | 528 | " |
| 50 | — | — | 2.8 | — | — | — | — | " |
| 51 | — | — | 2.2 | — | — | 58 | — | " |
| 52 | — | — | 1.7 | — | — | 63 | — | " |
| 53 | 6N NaOH | 9 ml | — | — | — | — | 216 | " |
| 54 | — | — | 1.7 | 4.1 | 12.2 | 67 | 424 | " |
| 55 | — | — | 1.7 | — | — | 68 | 456 | " |

*These coatings were produced on hot rolled steel panels which were 3inches × 1½inches and which were cleaned with acetone, pickled in 10% $H_2SO_4$ at 160–170°F, rinsed and dried.

tioned screw. The value of the force required to pull the dies along the rod is read from the dynamometer and it is recorded; this value is referred to herein as the "draw force." The places on the rod at which the increased compressive force is applied are noted and the thickness of the rod at these places is measured after the rod is removed from the testing machine. The values recorded during the test are then plotted on a graph in which the reduction in thickness of the rod in mils is the ordinate and the draw force in pounds is the abscissa. The graph can be used to read the number of pounds required to draw the dies along the rod as a compressive force, which produces a desired reduction in the thickness of the rod, is applied to the rod. The lower the draw force at any given reduction in thickness, the better the lubricating properties of the coating. Test specimens were coated with the compositions of Examples 49, 53 and 54 in Table 6 above. The coatings applied from the compositions of 49 and 53 were rinsed with tap water immediately after they were withdrawn from the coating bath; the coating of Example 54 was not rinsed. The specimens were then dried with compressed air. When these coated specimens were subjected to the drawmeter test, the recorded values were so similar that they could all be represented by one curve. Representative values from the curve are set forth in Table 7 below. For comparative purposes there is set forth also in Table 7 results that were obtained when test specimens lubricated with a naphthenic process oil were subjected to the drawmeter test.

TABLE 7

| reduction in thickness, mils | draw force in lbs. for: | |
|---|---|---|
| | Coatings of Examples 49, 53 & 54 | naphthenic process oil |
| 20 | 1640 | 2200 |
| 40 | 2450 | 3260 |
| 60 | 3280 | 4100 |
| 80 | 4100 | 4600 |
| 100 | 4520 | — |

As mentioned hereinabove, the lower the draw force at a given reduction in thickness, the better the lubricating properties of the coating. It is clear from Table 7 above that the lubricating properties of the coatings of the present invention out perform by far those of the process oil.

The next group of examples is illustrative of additional compositions within the scope of this invention, including compositions which contain fatty acids other than stearic acid.

Each of the aqueous disperions identified in Table 8 below was prepared by adding the amounts of emulsifier indicated in Table 8 to the liquid or molten fatty acid, adding water slowly at room temperature or above the melting point of the fatty acid, as required, stirring rapidly until emulsion was effected, and making final dilutions to the identified concentrations.

TABLE 8

| | | | Aqueous Dispersion | |
|---|---|---|---|---|
| | | | Emulsifier and Amount | |
| Ex. No. | fatty acid | Amt. of fatty acid, g/l | ethoxylated non-ionic[1] surfactant, g/l | alkyl aryl sulfonate[2], g/l |
| A | lauric | 50 | 20.0 | 5.0 |
| B | mixture of arachidic acid behinic acid[3] | 50 | 25.0 | 25.0 |
| C | iso-stearic[4] | 50 | 8.0 | 20.0 |
| D | oleic | 50 | — | 28.0 |
| E | mixture of stearic acid and methyl-dichlorostearate | 50 | 12.0 | 15.0 |

(1) Myrj 52-S sold by Atlas Chemical Industries, Inc.
(2) G-3300 sold by Atlas Chemical Industries, Inc.
(3) Hysterene 9122 sold by Humko Products
(4) Emery 3101D sold by Emery Industries, Inc.

To each of the above identified aqueous dispersion, there was added 1.7 g of hydrogen peroxide and 4.2 g of hydrofluoric acid per liter of coating composition. These compositions were used to coat cold rolled steel panels which were immersed in the composition for about 1 minute. The pH of each of the compositions was varied as set forth in Table 9 below by adding either sodium hydroxide or additional hydrofluoric acid; these compositions were used also to coat several panels which were immersed in the composition for about 1 minute.

TABLE 9

| Ex. No. | Emulsion | pH | Coating Wts., mg/sq. ft. |
|---|---|---|---|
| 56-1 | A | 4.1 | 108 |
| 56-2 | " | 4.2 | 206 |
| 57-1 | B | 4.2 | 190 |
| 57-2 | " | 4.4 | 540 |
| 57-3 | " | 4.9 | 377 |
| 58-1 | C | 4.1 | 30 |
| 58-2 | " | 4.8 | 290 |
| 58-3* | " | 4.6 | 194 |
| 59-1 | D | 4.1 | 600 |
| 59-2 | " | 4.6 | 790 |
| 59-3 | " | 4.9 | 144 |
| 59-4* | " | 4.3 | 744 |
| 60-1 | E | 4.1 | 108 |

*An additional 1.7 g/l of hydrogen peroxide was added to these compositions.

The next group of examples compares the lubricating properties of coatings formed from a composition within the scope of this invention with those formed from 3 different popularly used lubricating compositions. The lubricating properties of the coatings were evaluated on cold rolled steel rods in the drawmeter test.

EXAMPLE 61

One liter of aqueous lubricating coating composition within the scope of the present invention was prepared and contained the following ingredients:

| | grams per liter |
|---|---|
| stearic acid | 50.0 |
| ethoxylated non-ionic surfactant[1] | 14.0 |

-Continued

|  | grams per liter |
|---|---|
| alkyl aryl sulfonate[2] | 11.0 |
| hydrofluoric acid | 4.2 |
| hydrogen peroxide | 1.7 |
| sodium hydroxide | 4.8 |

[1]Myrj 52-S
[2]G-3300

A steel rod was immersed in this composition for about 1 minute. After being withdrawn from the composition, the coated rod was baked in an oven at about 124°C for about 10 minutes to dry the coating. The coating weight was about 400 mg per sq. ft.

Comparative Coating A

A commercially available heavy petroleum lubricating oil was applied to a steel rod. The weight of the oil film on the rod was about 400 mg per sq. ft.

Comparative Coating B

A coating was applied to a steel rod by immersing it in a coating composition containing phosphoric acid and stearic acid in a non-aqueous solvent system. A phosphate and organic luricating coating, which weighed about 400 mg per sq. ft., was formed on the rod Comparative Coating C A heavy phosphate coating weighing 2,000 mg per sq. ft. was applied to a steel rod by immersing it in an acidic aqueous coating solution of zinc phosphate for 10 minutes. The phosphate-coated rod was immersed in an aqueous sodium stearate solution and coated. The total coating weight was about 2,500 mg per sq. ft.

The coated rods were subjected to the drawmeter test. The results of the tests are set forth in Table 10 below.

TABLE 10

| reduction in thickness mils | Draw force in lbs for: | | | |
|---|---|---|---|---|
|  | Ex. 61 400 mg/ ft² | Compar. Coating A, 400 mg/ft² | Compar. Coating B 400 mg/ft² | Compar. Coating C, 2500 mg/ft² |
| 20 | 1440 | 2540 | 1460 | 1400 |
| 40 | 2190 | 3370 | 2200 | 2040 |
| 60 | 2940 | 4000 | 2960 | 2700 |
| 80 | 3670 | 4540 | 3700 | 3380 |
| 100 | 4220 | — | 4390 | 3930 |

From Table 10, it can be seen that the lubricating properties of the coating of Example 61 were much better than those of the heavy petroleum lubricating oil (comparative coating A). The lubricating properties of the coating of Example 61 and comparative coating B were similar, but it is noted that a disadvantage of the composition utilized to form comparative coating B is that it contains organic solvents, the vapors of which should be removed by venting equipment to lessen the risk of fire and toxicity hazards. It is noted also that the lubricating properties of the coating of Example 61 compare favorably with those of comparative coating C, notwithstanding that the former weighs much less than the latter. The coating application method for applying the phosphate coating and the organic lubricating coating requires the performance of the following three or four steps; (1) application of phosphate coating; (2) water rinse; (3) neutralizing rinse required usually; and (4) application of reactive soap-type lubricant. The multi-step process is a disadvantage of using this type of extreme pressure lubricant.

The next example shows the use of an alkali metal peroxide in a coating composition within the scope of the present invention.

EXAMPLE 62

There was prepared 1 liter of an aqueous lubricating coating composition alike in all respects to the composition of Example 61 except that 3.4 g/l of sodium peroxide was substituted for hydrogen peroxide and no sodium hydroxide was added to the composition. A cold rolled steel panel was immersed in the composition for about 1 minute. The coating formed on the panel weighed about 300 mg per sq. ft.

The next group of examples illustrates the use of different types of coating-forming lubricants that can be used in the practice of this invention.

Examples 63–66 set forth in Table 11 below shows compositions that were formulated. Aqueous dispersions of the coating-forming lubricant were prepared utilizing the dispersants identified in Table 11 and then the HF and $H_2O_2$ were added to the dispersions in the concentrations indicated in Table 11.

TABLE 11

| Ex. No. | Lubricant | Amt. of lub. g/l | Dispersant, g/l | Concentrations g/l | |
|---|---|---|---|---|---|
|  |  |  |  | HF | $H_2O_2$ |
| 63 | mineral oil | 213 | 89[1] | 4.2 | 2.0 |
| 64 | degras | 50 | 25[2] | 2.1 | " |
| 65 | beeswax | " | " | " | " |
| 66 | tallow | " | " | " | " |

[1]Mixtures of high molecular weight organic acids, esters & lactones derived from oxidized petroleum factions (sold as Alox 575 by Alox Corp.)
[2]Nonyl phenoxy polyethoxy ethanol (sold by Rhom & Haas Co. as Triton N 101)

The compositions of Example Nos. 63–66, modified by the additions thereto of HF and NaOH, as indicated in Table 12 below, were used to coat cold rolled steel panels by immersing them in the composition for 1 minute, except that the panels of Examples 61–1 to 63–3 were immersed for 5 minutes. The results are set forth in Table 12.

TABLE 12

| Ex. No. | Ingreds. Added | | pH of Comp. | Wt., mg /sq. ft. | Coatings Appearance |
|---|---|---|---|---|---|
|  | HF, g/l | 6N NaOH, ml/l |  |  |  |
| 63-1 | 4.2 | — | 2.2 | 91 | uniform film |
| 63-2 | — | 5 | 2.6 | 25 | non-uniform film |
| 63-3 | — | 5 | 3.5 | 0.5 | dark stain |
| 64-1 | 2.1 | — | 2.1 | 278 | uniform film |
| 64-2 | — | 5 | 3.0 | 295 |  |
| 64-3 | — | 5 | 3.6 | 24 | slight film |
| 65-1 | 2.1 | — | 2.1 | 487 | uniform film |
| 65-2 | — | 5 | 3.0 | 223 | non-uniform film |
| 65-3 | — | 5 | 3.6 | 24 | stained |
| 65-4 | 0.4 | — | n.m.* | 240 | uniform film |
| 65-5 | 0.4 | — | 3.1 | 300 | non-uniform film |
| 66-1 | 2.1 | — | 2.0 | 46 | non-uniform film |
| 66-2 | — | 2.5 | 2.5 | 94 | uniform film |
| 66-3 | — | 2.5 | 2.9 | 31 | non-uniform film |
| 66-4 | — | 5 | 3.8 | 0 | no coating |
| 66-5 | 0.8 | — | 4.0 | 86 | uniform film |

*not measured

From Table 12 above it can be seen that the operating pH's for compositions within the scope of this invention will tend to differ depending on the particular coating-forming lubricant used. For example, in Example No. 64-2 uniform coatings were obtained at a pH of 3.0 utilizing degras, but non-uniform coatings were obtained with beeswax at a pH of 3.0 (Example No. 65-2). The non-uniform coatings were characterized by a partial coating of the metal panel. With respect to pH measurement, it is noted that an accurate determination of pH of the coating composition can be difficult because of the effect which fluoride ion has on electrodes of the pH measuring apparatus. As mentioned hereinabove, it is recommended that operating pH values of the composition be determined on the basis of experience.

Example 67 below is another embodiment of a composition within the scope of the present invention.

EXAMPLE 67

1 liter of aqueous composition containing 50 grams of stearic acid, 2 grams of fluoride (added as hydrofluoric acid) and 1.5 grams of hydrogen peroxide was prepared. This composition also contained 20 mls of an anionic surfactant and a few mls of a nonionic surfactant. The anion surfactant was Tergitol Anionic P-28 sodium di-(2-ethylhexyl) phosphate. The nonionic surfactant was Triton N100 (an ethoxylated nonyl phenol). The stearic acid, the coating-forming ingredient, was present in the composition in emulsified form. A steel panel was immersed in the composition for 5 minutes. Upon withdrawal of the panel it was found that there had formed thereon a coating of stearic acid, which coating could not be rinsed off with running tap water.

The present invention has a number of important characteristics. The coating composition can be used to form good lubricating coatings on metallic surfaces rapidly at ambient temperature. The aqueous composition does not have the toxicity and fire hazards of lubricating compositions made from volatile solvents. A dry lubricant coating can be produced. The simplicity of treatment of the metallic surface with the lubricating composition is also an advantage.

We claim:

1. A method for applying a lubricating coating to a metallic surface comprising: applying to said surface an acidic aqueous coating composition consisting essentially of, in coating-forming amounts and as essential ingredients, an organic non-resinous coating-forming lubricant dispersed in the aqueous phase of the coating composition, at least about 0.01 oxidizing equivalent per liter of an oxidizing agent which contains oxygen and at least about 2 g/l of fluoride ion.

2. A method according to claim 1 wherein said lubricant is selected from the group consisting of fatty oils, fatty acids, waxes and mineral oils.

3. A method according to claim 2 wherein said fatty acid is stearic acid.

4. A method for applying a lubricating coating to a ferriferous or zinciferous surface comprising: applying to said surface an acidic aqueous coating composition consisting essentially of, in coating-forming amounts and as essential ingredients, stearic acid dispersed in the aqueous phase of the composition, about 2 g/l to about 8 g/l of fluoride ion, about 0.1 to about 0.2 oxidizing equivalent per liter of peroxide oxidizing agent and wherein pH of the composition is within the range of about 2 to about 5.

5. A method according to claim 4 wherein the amount of said stearic acid is about 20 g/l to about 80 g/l.

6. A method according to claim 5 wherein the pH of the composition is about 2.7 to about 3.5.

7. A method for applying a lubricating coating to a ferriferous or zinciferous surface comprising: applying to said surface a coating composition consisting essentially of, in coating-forming amounts, about 20 g/l to about 80 g/l of stearic acid dispersed in the aqueous phase of the composition, about 2 g/l to about 8 g/l of fluoride ion and about 0.1 to about 0.2 oxidizing equivalent per liter of hydrogen peroxide, wherein the source of fluoride ion is hydrofluoric acid and wherein the pH of the composition is within the range of about 2 to about 5.

8. A method according to claim 7 wherein said surface is a ferriferous surface, wherein said composition is applied to said ferriferous surface by immersing it therein and wherein said ferriferous surface is withdrawn from said composition after said coating has formed.

9. A method according to claim 8 wherein the pH of said composition is within the range of about 2.7 to about 3.5.

10. A method according to claim 8 wherein said ferriferous surface is immersed in said composition for about 15 seconds to about 5 minutes.

11. A method according to claim 1 wherein said surface is a ferriferous or zinciferous surface.

12. A method according to claim 1 wherein the pH of said composition is within the range of about 2 to about 5.

13. A method according to claim 1 wherein said surface is a ferriferous surface, wherein the pH of said composition is within the range of about 2 to about 5 and wherein said oxidizing agent is a peroxide.

* * * * *